(12) United States Patent
Aston et al.

(10) Patent No.: US 10,018,426 B2
(45) Date of Patent: Jul. 10, 2018

(54) COMPOSITE HEAT PIPES AND SANDWICH PANELS, RADIATOR PANELS, AND SPACECRAFT WITH COMPOSITE HEAT PIPES

(71) Applicant: The Boeing Company, Chicago, IL (US)

(72) Inventors: Richard W. Aston, Brea, CA (US); Anna Maria Tomzynska, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 15/153,386

(22) Filed: May 12, 2016

(65) Prior Publication Data

US 2017/0328647 A1   Nov. 16, 2017

(51) Int. Cl.
*F28D 15/00* (2006.01)
*F28D 15/02* (2006.01)
(Continued)

(52) U.S. Cl.
CPC .......... *F28D 15/0275* (2013.01); *B23P 15/26* (2013.01); *B64G 1/503* (2013.01);
(Continued)

(58) Field of Classification Search
CPC .... F28D 15/0275; F28D 15/04; F28D 15/043; F28D 15/06; B23P 15/26; B64G 1/503; B64G 1/506
(Continued)

(56) References Cited

U.S. PATENT DOCUMENTS

| | | |
|---|---|---|
| 6,378,809 B1 | 4/2002 | Pon |
| 7,036,772 B2 | 5/2006 | Walker et al. |

(Continued)

FOREIGN PATENT DOCUMENTS

| | | |
|---|---|---|
| DE | 41 30 976 | 3/1993 |
| DE | 10340092 | 5/2005 |

(Continued)

OTHER PUBLICATIONS

Machine generated English translation of the abstract of EP 2388195, downloaded from Espacenet.com on Jun. 9, 2016.

(Continued)

*Primary Examiner* — Davis Hwu
(74) *Attorney, Agent, or Firm* — Dascenzo Intellectual Property Law, P.C.

(57) ABSTRACT

Composite heat pipes, methods of assembling composite heat pipes, sandwich panels having one or more composite heat pipes, methods of assembling sandwich panels, radiator panels, methods of assembling radiator panels, spacecraft, and methods of assembling spacecraft are disclosed. Composite heat pipes include an elongate conductive casing and one or more fiber reinforced composite layers operatively coupled to one or more lateral sides of the elongate conductive casing. Sandwich panels include two spaced-apart face-sheets, a core positioned between the two spaced-apart face-sheets, and one or more composite heat pipes. Spacecraft include a body and two radiator panels operatively coupled to the body opposite each other.

21 Claims, 5 Drawing Sheets (51) Int. Cl.
  B23P 15/26      (2006.01)
  B64G 1/50       (2006.01)
  F28D 15/04      (2006.01)
  F28D 21/00      (2006.01)
(52) U.S. Cl.
  CPC ............. B64G 1/506 (2013.01); F28D 15/04 (2013.01); *F28D 2021/0021* (2013.01)
(58) Field of Classification Search
  USPC .................................................. 165/104.26
  See application file for complete search history.

(56) References Cited

U.S. PATENT DOCUMENTS

| | | | |
|---|---|---|---|
| 8,820,684 | B2 | 9/2014 | McKinnon et al. |
| 2002/0145082 | A1 | 10/2002 | Bertheux et al. |
| 2003/0230399 | A1* | 12/2003 | Hurlbert ............... F28D 1/0246 165/104.25 |
| 2004/0149421 | A1 | 8/2004 | Wiacek et al. |
| 2004/0188568 | A1 | 9/2004 | Gayrard et al. |
| 2004/0232284 | A1 | 11/2004 | Tjiptahardja et al. |
| 2005/0211850 | A1 | 9/2005 | Sebata et al. |
| 2007/0090737 | A1* | 4/2007 | Hu ............................ F21K 9/00 313/11 |
| 2007/0221787 | A1 | 9/2007 | McKinnon et al. |
| 2007/0240855 | A1* | 10/2007 | Hou ...................... F28D 15/046 165/104.26 |
| 2007/0247812 | A1* | 10/2007 | Behrens ................... F28F 3/12 361/699 |
| 2009/0107558 | A1* | 4/2009 | Quigley .................. F16L 11/12 137/15.01 |
| 2010/0019093 | A1 | 1/2010 | Russell |
| 2012/0125571 | A1 | 5/2012 | Lutz et al. |
| 2013/0043004 | A1* | 2/2013 | Wang .................. F28D 15/0283 165/104.21 |
| 2013/0048250 | A1* | 2/2013 | Pokharna .............. F28F 21/084 165/104.26 |
| 2014/0239124 | A1 | 8/2014 | Aston et al. |
| 2015/0280329 | A1 | 10/2015 | Sanford et al. |
| 2015/0315430 | A1 | 11/2015 | Nguyen et al. |
| 2016/0101591 | A1 | 4/2016 | Khan |
| 2016/0153493 | A1 | 6/2016 | Henninger et al. |
| 2016/0318261 | A1 | 11/2016 | Storer et al. |

FOREIGN PATENT DOCUMENTS

| | | |
|---|---|---|
| DE | 102005039783 | 3/2007 |
| DE | 10 2006 02573 | 12/2007 |
| EP | 2388195 | 11/2011 |
| JP | H11 148787 | 6/1999 |
| JP | 2004 019990 | 1/2004 |
| WO | WO 87/06252 | 10/1987 |

OTHER PUBLICATIONS

Machine generated English translation of the abstract of DE 102005039783, downloaded from Espacenet.com on Jun. 9, 2016.
Machine generated English translation of the abstract of DE 10340092, downloaded from Espacenet.com on Jun. 9, 2016.
U.S. Appl. No. 14/592,609, dated Jan. 8, 2015, Aston et al.
European Patent Office, Extended European Search Report for related European Application No. 17163518, dated Oct. 2, 2017.
Machine-generated English translation of the abstract of DE 10 2006 025733, downloaded from Espacenet.com on Oct. 30, 2017.
Machine-generated English translation of the abstract of JP 2004 019990, downloaded from Espacenet.com on Oct. 30, 2017.
Machine-generated English translation of the abstract of JP H11 148787, downloaded from Espacenet.com on Oct. 30, 2017.
Machine-generated English translation of the abstract of DE 41 30 976, downloaded from Espacenet.com on Oct. 30, 2017.

* cited by examiner

COMPOSITE HEAT PIPES AND SANDWICH PANELS, RADIATOR PANELS, AND SPACECRAFT WITH COMPOSITE HEAT PIPES

FIELD

The present disclosure relates to heat pipes and to radiator panels that include heat pipes.

BACKGROUND

Heat pipes are heat transfer devices that rely on phase transition of a working fluid to transfer heat from one location to another, such as from an electronic device to a heat sink. Heat pipes may be constructed of various materials depending on an application for the heat pipe, but typically the bodies of heat pipes are constructed of a metal, such as aluminum, due to its heat transfer characteristics and density. As an example, heat pipes are often used to draw heat away from electronic equipment to prevent the electronic equipment from overheating. In some applications, thermal expansion and contraction of heat pipes due to extreme temperature changes may be undesirable.

Spacecraft include a plethora of equipment, such as electronic equipment, that generates heat. This heat must be dissipated, and because space is essentially void of air, the heat must be radiated to outer space. Spacecraft, such as satellites, typically include radiator panels that draw the heat from electronics and other equipment to an outer surface of the spacecraft. Thermal expansion and contraction of a radiator panel may affect the precision of a spacecraft's communication equipment's pointing to Earth and/or to another spacecraft or other object in outer space. For some spacecraft, the precise pointing of communication equipment is critical to its function. Historically, radiator panels have been constructed of materials that have similar coefficients of thermal expansion (CTE) so as to minimize distortions of the radiator panels due to thermal imbalance and thus to minimize the effect on the pointing of communication equipment. Additionally, radiator panels historically have been used as a ground, or power return, for electronic equipment, including communication equipment, that is supported by radiator panels. Accordingly, radiator panels historically have been constructed with aluminum honeycomb cores sandwiched between aluminum face-sheets and with aluminum heat pipes extending through the cores.

SUMMARY

Composite heat pipes, methods of assembling composite heat pipes, sandwich panels having one or more composite heat pipes, methods of assembling sandwich panels, radiator panels, methods of assembling radiator panels, spacecraft, and methods of assembling spacecraft are disclosed herein.

Composite heat pipes include an elongate conductive casing that defines an internal volume having an outer peripheral region, a wick structure positioned within the outer peripheral region of the internal volume of the elongate conductive casing, a working fluid within the internal volume of the outer peripheral region, and one or more fiber reinforced composite layers operatively coupled to one or more external, lateral sides of the elongate conductive casing. Each fiber reinforced composite layer comprises a plurality of elongate fibers longitudinally aligned with the elongate conductive casing and operatively coupled together by a binding material. Methods of assembling composite heat pipes include operatively coupling one or more fiber reinforced composite layers to one or more external, lateral sides of an elongate conductive casing.

Sandwich panels include two spaced-apart face-sheets, a core positioned between the two spaced-apart face-sheets, and one or more composite heat pipes. Methods of assembling sandwich panels include operatively coupling a first face-sheet to a core, operatively coupling a second face-sheet to the core opposite the first face-sheet, and operatively positioning one or more composite heat pipes between the first face-sheet and the second face-sheet.

Radiator panels include two spaced-apart face-sheets including an inside face-sheet and an outside face-sheet that are constructed of a fiber reinforced composite material, a honeycomb core positioned between the two spaced-apart face-sheets, and one or more heat pipes extending through the honeycomb core. The fiber reinforced composite material of the face-sheets includes two different types of fibers. Methods of assembling radiator panels include operatively coupling an inside face-sheet to a honeycomb core, operatively coupling an outside face-sheet to the honeycomb core opposite the inside face-sheet, and operatively positioning one or more heat pipes between the inside face-sheet and the outside face-sheet.

Spacecraft include a body and two radiator panels operatively coupled to the body opposite each other. Methods of assembling spacecraft include operatively coupling a radiator panel to a body of the spacecraft.

DESCRIPTION

Composite heat pipes, methods of assembling composite heat pipes, sandwich panels having one or more composite heat pipes, methods of assembling sandwich panels, radiator panels, methods of assembling radiator panels, spacecraft, and methods of assembling spacecraft are disclosed herein.

Figure 1:
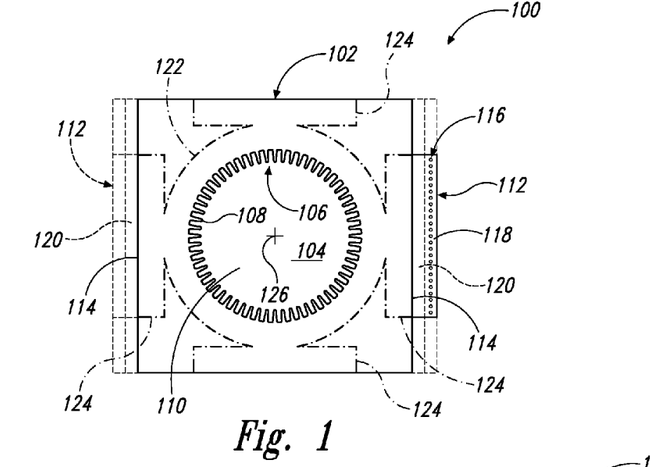
FIG. 1 is a schematic profile view representing composite heat pipes according to the present disclosure.
Figure 2:
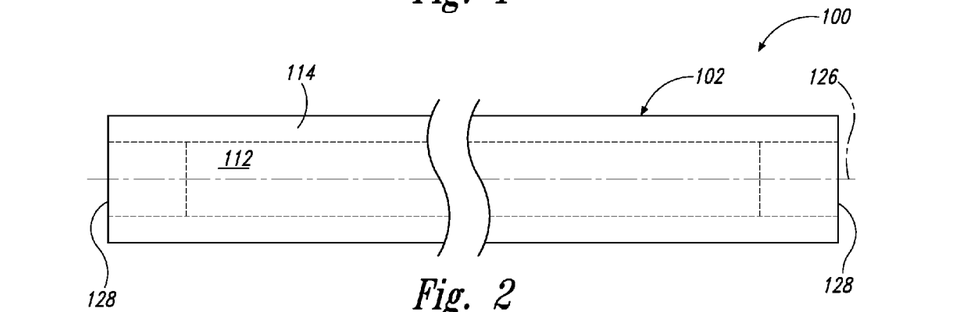
FIG. 2 is a schematic side view representing composite heat pipes according to the present disclosure.

FIGS. 1 and 2 schematically illustrate composite heat pipes 100 according to the present disclosure. Composite heat pipes 100 include an elongate conductive casing 102, a wick structure 108, a working fluid 110, and one or more fiber reinforced composite layers 112. The elongate conductive casing 102 defines an internal volume 104 having an outer peripheral region 106. The wick structure 108 is positioned within the outer peripheral region 106, and the working fluid 110 is within the internal volume 104. The one or more fiber reinforced composite layers 112 are operatively coupled to one or more external, lateral sides 114 of the elongate conductive casing 102.

The elongate conductive casing 102 is schematically represented in solid lines in FIG. 1 with a square profile; however, any suitable profile shape of elongate conductive casing 102 is within the scope of the present disclosure, including, for example, a circular profile or, as schematically represented in FIG. 1 in dash-dot lines, a flanged configuration with a body 122 having a circular profile and four planar extensions 124 spaced-apart around and extending longitudinally along the body 122. The elongate conductive casing 102 may be constructed of any suitable material that has desirable thermal conductive properties for a particular application, with aluminum, copper, and steel being illustrative, non-exclusive examples. In some examples, the elongate conductive casing 102 may be formed by an extrusion process. In some such examples, the wick structure 108 may be integrally formed with the elongate conductive casing 102 to form a monolithic structure.

The wick structure 108 of composite heat pipes 100 may take any suitable form depending on a particular application of a composite heat pipe 100, including (but not limited to) sintered metal powders, screens, and grooves. The schematic representation of composite heat pipes 100 generally shows the wick structure 108 in the form of grooves that are integral with the elongate conductive casing 102, but composite heat pipes 100 are not limited to such examples, and other configurations of wick structures 108 may be incorporated into composite heat pipes 100 according to the present disclosure.

The working fluid 110 of composite heat pipes 100 may take any suitable form depending on a particular application of a composite heat pipe 100, with water, refrigerant, ammonia, alkali metals, nitrogen, oxygen, neon, hydrogen, helium, methanol, ethane, and lithium being illustrative, non-limiting examples.

As mentioned, composite heat pipes 100 include one or more fiber reinforced composite layers 112 that are operatively coupled to one or more external, lateral sides 114 of the elongate conductive casing 102. A lateral side 114 of an elongate conductive casing 102 is an external side that is parallel to a longitudinal axis 126 of the elongate conductive casing 102, for example, in contrast to an end face 128 of the composite heat pipe 100. In some examples, a lateral side 114 may be planar, but such a configuration is not required in all examples of elongate conductive casings 102, such as in a composite heat pipe 100 having an elongate conductive casing 102 with a circular profile.

As schematically illustrated in FIG. 1, each fiber reinforced composite layer 112 includes a plurality of elongate fibers 116 that are longitudinally aligned with the elongate conductive casing 102 and that are operatively coupled together by a binding material 118. In other words, the elongate fibers 116 are generally parallel to the longitudinal axis 126 of the elongate conductive casing 102. In some examples, the elongate fibers 116 may be described as being unidirectional. By being elongate and unidirectional, the elongate fibers 116, and thus the one or more fiber reinforced composite layers 112 may provide desirable thermal and strength characteristics to the composite heat pipe 100, as a whole.

A fiber reinforced composite layer 112 may be constructed in any suitable manner, such as based on manufacturability, ultimate applications, typical temperatures to which a composite heat pipe 100 will be exposed, etc. For example, a fiber reinforced composite layer 112 may comprise and/or be described as a film or a laminate. In some examples, a fiber reinforced composite layer 112 may be described as being formed from a prepreg. Additionally or alternatively, the binding material 118 may comprise an adhesive tape, and the elongate fibers 116 may be adhered to a face of the adhesive tape and/or may be embedded in the adhesive tape. Additionally or alternatively, in some examples, the elongate fibers 116 may be within a matrix of the binding material 118. The binding material 118 may be any suitable material, depending on the ultimate application of the composite heat pipe 100, for example, depending on the temperature ranges to which the composite heat pipe 100 is exposed. Illustrative, non-exclusive examples of binding material 118 include (but are not limited to) epoxy, cyanate ester, polyimide, bismaleimide resin, and phenolic resin.

In some examples of fiber reinforced composite layers 112, the elongate fibers 116 comprise a density of 0.05-0.10 lbs/in.$^3$ within the fiber reinforced composite layer 112.

In some examples of fiber reinforced composite layers 112, and as schematically represented in FIG. 1, the elongate fibers 116 are spaced-apart within the fiber reinforced composite layer 112.

The elongate fibers 116 of a fiber reinforced composite layer 112 may be of any suitable material and size such that the elongate fibers 116 have desired properties for a particular application of a composite heat pipe 100. Illustrative, non-exclusive examples of elongate fibers 116 include (but are not limited to) boron fibers and high strength carbon fibers. In some examples, the elongate fibers 116 have an average diameter in the range of 50-200 μm, 50-150 μm, 50-100 μm, 100-200 μm, 100-150 μm, or 150-200 μm.

Moreover, in some examples of composite heat pipes 100, the elongate fibers 116 may be constructed of a material that has tensile and compression strengths that are different than tensile and compression strengths of the material from which the elongate conductive casing 102 is constructed. For example, tensile and/or compression strengths of the elongate fibers 116 may be at least 1.5, at least 2, at least 5, or at least 10 times tensile and/or compression strengths of the elongate conductive casing 102. As an illustrative, non-limiting example, the elongate fibers 116 may have a tensile strength and/or a compression strength in the range of 500-600 ksi. As a result of the elongate fibers 116, and thus the fiber reinforced composite layer(s) 112, having a tensile strength and/or a compression strength that differs from a tensile strength and/or a compression strength of the elongate conductive casing 102, the composite heat pipe 100, as a whole, may have resultant physical properties that are desirable for using the composite heat pipes 100 in certain applications that are subject to extreme temperature changes. For example, in the application of a composite heat pipe 100 being used in a radiator panel, such as a radiator panel of a spacecraft, deformation of the radiator panel as a result of an extreme temperature change may be detrimental to the performance of the spacecraft, and a composite heat pipe 100 may diminish or otherwise restrict, or even prevent, undesirable deformation as a result of tensile and/or compression strengths of the elongate fibers 116. Accordingly, a fiber reinforced composite layer 112 may be described as a strap, a restraining strap, and/or a composite restraining strap.

That is, as a result of the elongate conductive casing 102 having different tensile and/or compression strengths than the elongate fibers 116 and the fiber reinforced composite layer(s) 112, the overall coefficient of thermal expansion of the composite heat pipe may be 25-75%, 30-70%, 40-60%, or about 50% of the coefficient of thermal expansion of the elongate conductive casing 102 by itself, or of a heat pipe that does not include one or more fiber reinforced composite layers 112 according to the present disclosure. As an illustrative example only, an aluminum heat pipe without one or more fiber reinforced composite layers 112 operatively coupled to the heat pipe's casing may have a coefficient of thermal expansion of about 12.5 ppm/° F. In contrast, a composite heat pipe 100 according to the present disclosure with an aluminum elongate conductive casing 102 and one or more fiber reinforced composite layers 112 operatively coupled to lateral sides 114 of the elongate conductive casing 102 may have a coefficient of thermal expansion in the range of 5-7.5 ppm/° F.

With continued reference to FIG. 1, as schematically illustrated in solid lines, composite heat pipes 100 include at least one fiber reinforced composite layer 112 that is operatively coupled to a lateral side 114 of the elongate conductive casing 102. As schematically represented in dashed lines in FIG. 1, a composite heat pipe 100 may include two fiber reinforced composite layers 112 that are operatively coupled to opposing external, lateral sides 114 of the elongate conductive casing 102. Such a configuration may be desirable, for example, to restrict undesirable stresses within the elongate conductive casing 102 that otherwise may result when subjected to temperature changes. However, it also is within the scope of the present disclosure that fiber reinforced composite layers 112 are coupled to more than two external, lateral sides 114, and even, optionally, fiber reinforced composite layers 112 that extend, or wrap, completely around the elongate conductive casing 102.

A fiber reinforced composite layer 112 may span an entire width of a lateral side 114, such as schematically represented in FIG. 1 in dashed lines. However, such a configuration is not required, and additionally or alternatively, a fiber reinforced composite layer 112 may span less than an entire width of a lateral side 114, such as schematically represented in FIG. 1 in solid lines. Similarly, a fiber reinforced composite layer 112 may span an entire length of a lateral side 114 or may span less than an entire length of a lateral side 114. In some examples, a fiber reinforced composite layer 112 may be coextensive, or substantially coextensive, with a lateral side 114, and in other examples, a fiber reinforced composite layer 112 may not be coextensive, or substantially coextensive, with a lateral side 114. The schematic representations of FIGS. 1 and 2 are intended to schematically represent any such configurations of fiber reinforced composite layers 112 relative to lateral sides 114.

As mentioned, in a composite heat pipe 100, a fiber reinforced composite layer 112 is operatively coupled to an external, lateral side 114 of the elongate conductive casing 102. By "operatively coupled," it is meant that the fiber reinforced composite layer 112 may be directly engaging, or touching, a lateral side 114 of the elongate conductive casing 102, or that the fiber reinforced composite layer 112 may be indirectly coupled, and not directly engaging, or touching, a lateral side 114 of the elongate conductive casing 102. For example, when the binding material 118 of a fiber reinforced composite layer 112 comprises an adhesive tape, the adhesive tape may be directly adhered to a lateral side 114 of the elongate conductive casing 102. However, as schematically and optionally illustrated in dashed lines in FIG. 1, a composite heat pipe 100 may further include a separate adhesive layer 120 that is between a fiber reinforced composite layer 112 and a lateral side 114 of the elongate conductive casing 102.

When present, the adhesive layer 120 may be constructed of any suitable adhesive material, including (but not limited to) an epoxy adhesive, depending on the application of the composite heat pipe 100 and the temperatures to which the composite heat pipe 100 may be subjected. In some applications, it may be desirable to utilize a desired thickness of adhesive, such as with the adhesive layer 120 having a thickness of 0.005-0.025 inches. For example, in some applications, it may be desirable for the adhesive layer 120 to absorb strain between the elongate conductive casing 102 and the fiber reinforced composite layer 112 when the composite heat pipe 100 is subject to temperature changes.

Figure 3:
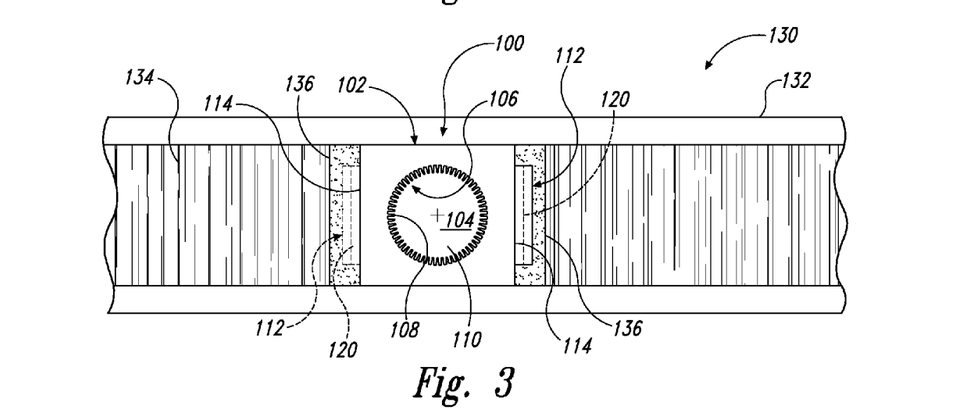
FIG. 3 is a schematic profile view representing sandwich panels having at least one composite heat pipe according to the present disclosure.

Turning now to FIG. 3, composite heat pipes 100 may be used as a structural component of a sandwich panel 130. More specifically, a sandwich panel 130 includes two spaced-apart face-sheets 132, a core 134 that is positioned between the two spaced-apart face-sheets 132, and one or more composite heat pipes 100 extending through the core 134 without the one or more fiber reinforced composite layers 112 extending directly between the one or more composite heat pipes 100 and the two spaced-apart face-sheets 132. Sandwich panels 130 may be constructed and utilized for any suitable application, including (but not limited to) radiator panels for spacecraft, radiator panels for phased arrays, and base plates for antennae.

Face-sheets 132 may be constructed of any suitable material depending on the application and/or desired properties of a sandwich panel 130. As illustrative, non-exclusive examples, face-sheets 132 may be constructed of sheet metal, such as aluminum or steel, or of a composite material, such as a reinforced composite material. As used herein, a "reinforced composite material" refers to a material that includes a polymer or other binding material matrix together with a filler. The filler may be fibers, particulates, or other configurations of material depending on the desired properties of the reinforced composite material. Moreover, the filler may be ordered, such as woven fibers or longitudinally aligned fibers, or the filler may be disordered, such as randomly ordered. Examples of filler include (but are not limited to) carbon particles, carbon fibers, boron fibers, polyaramid fibers, glass fibers, and/or other particles and/or fibers. When the filler includes fibers, the reinforced composite material may be referred to as a fiber reinforced composite material.

Cores 134 may have any suitable configuration and may be constructed of any suitable material depending on the application and/or desired properties of a sandwich panel 130. In some applications, a core 134 may be a honeycomb core. For example, honeycomb cores may provide desired compression and weight properties. Honeycomb cores are structures that are defined by a plurality of thin wall sections, or ligaments, that define hollow cells. Typically, although not required in all examples, the cells are hexagonal in cross-section. Illustrative, non-exclusive examples of materials from which a core 134 may be constructed include metal, plastics, and reinforced composite materials, including fiber reinforced composite materials.

Although not required in all examples, sandwich panels 130 additionally may include a foam adhesive 136 that operatively couples one or more composite heat pipes 100 to the core 134 of a sandwich panel 130. For example, as schematically illustrated in FIG. 3, the foam adhesive 136, when present, may extend between the lateral sides of a composite heat pipe 100 and the core 134 to operatively couple the composite heat pipe 100 to the core 134. An illustrative, non-exclusive example of a suitable foam adhesive 136 in some applications includes the FM 410-1™ foam adhesive from CYTEC SOLVAY GROUP™.

Figure 4:
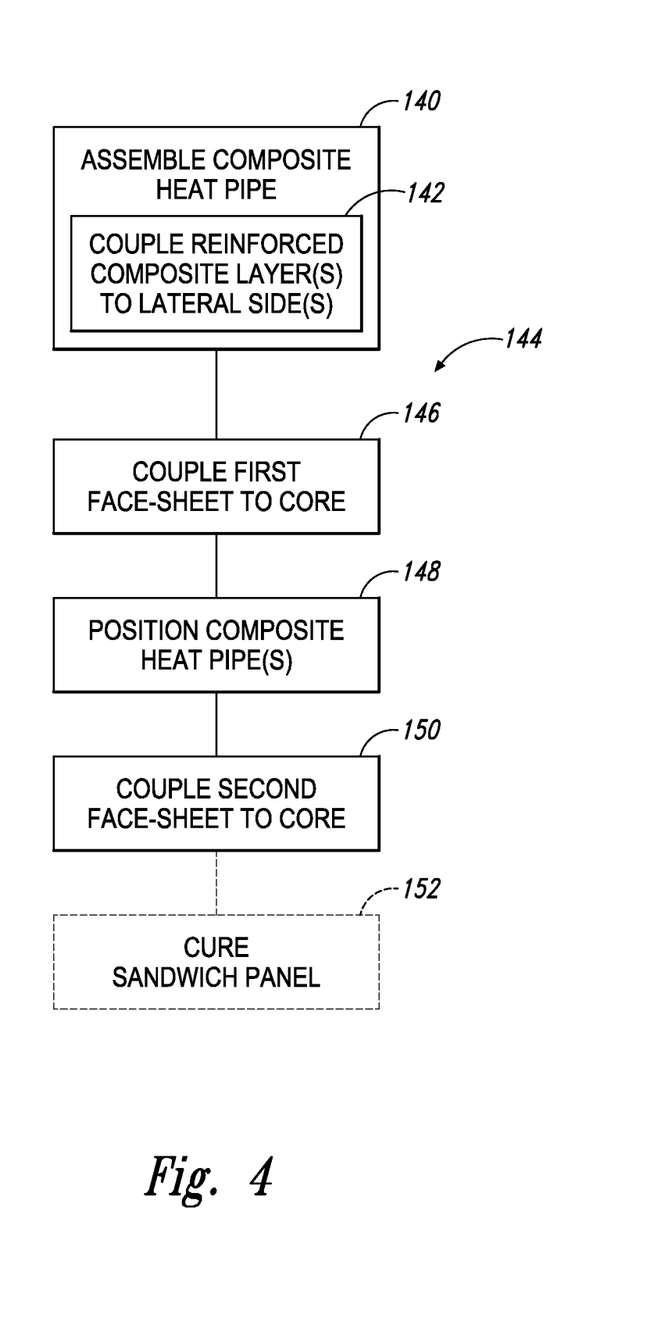
FIG. 4 is a flowchart schematically representing methods according to the present disclosure.

FIG. 4 schematically provides a flowchart that represents illustrative, non-exclusive examples of methods according to the present disclosure. In FIG. 4, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 4 are not limiting and other methods and steps are within the scope of the present disclosure, including methods having greater than or fewer than the number of steps illustrated, as understood from the discussions herein.

As schematically illustrated in solid boxes in FIG. 4, methods 140 of assembling a composite heat pipe 100 include operatively coupling one or more fiber reinforced composite layers 112 to one or more external, lateral sides 114 of an elongate conductive casing 102, as indicated at 142. For example, the one or more fiber reinforced composite layers 112 may be operatively coupled to one of more external, lateral sides 114 by an adhesive layer 120, as discussed herein.

In some methods 140, the operatively coupling 142 is performed in an environment at 50-100° Fahrenheit (F) or at room temperature.

As also schematically illustrated in FIG. 4, methods 144 of assembling a sandwich panel 130 are within the scope of the present disclosure. As indicated in solid boxes, methods 144 include operatively coupling a first face-sheet 132 to a core 134, as indicated at 146, operatively positioning one or more composite heat pipes 100 relative to the first face-sheet 132 and the core 134, as indicated at 148, and operatively coupling a second face-sheet 132 to the core 134 opposite the first face-sheet 132, as indicated at 150.

Some methods 144 further include (but are not required to include), prior to the operatively positioning 150, performing a method 140 of assembling the one or more composite heat pipes 100.

As schematically and optionally illustrated in a dashed box in FIG. 4, some methods 144 also include, following the operatively coupling 146, the operatively positioning 148, and the operatively coupling 150, curing the sandwich panel 130 at an elevated temperature, such as at a temperature of 150-250° F., as indicated at 152. In some such methods 144 that also include operatively coupling 142 in an environment at 50-100° Fahrenheit (F) or at room temperature, it may be advantageous that the operatively coupling 142 is performed at a lower temperature than the required curing temperature of the sandwich panel 130 as a whole. More specifically, when the fiber reinforced composite layers 112 are bonded to the elongate conductive casing 102 at a non-elevated temperature (e.g., at room temperature), the bonding results in zero, or near zero, internal stress within the bond. Subsequently, when the sandwich panel 130 is cured with the composite heat pipe 100 between two spaced-apart face sheets 132 at an elevated temperature, the strain between the composite heat pipe 100 and the spaced-apart face sheets 132 is minimized due to the effective coefficient of thermal expansion of the composite heat pipe 100 being lower than if it were not previously cured at the non-elevated temperature. As a result, the integrity of the bond between the spaced-apart face sheets 132 and the composite heat pipe 100 is maintained both during cure and subsequent thermal cycling in use. For example, when a sandwich panel 130 is exposed to an extreme cold temperature, less strain between the one or more fiber reinforced composite layers 112 and the elongate conductive casing 102 may result, than if the operatively coupling 142 also were performed at the elevated temperature at which the sandwich panel 130 is cured as a whole.

Figure 5:
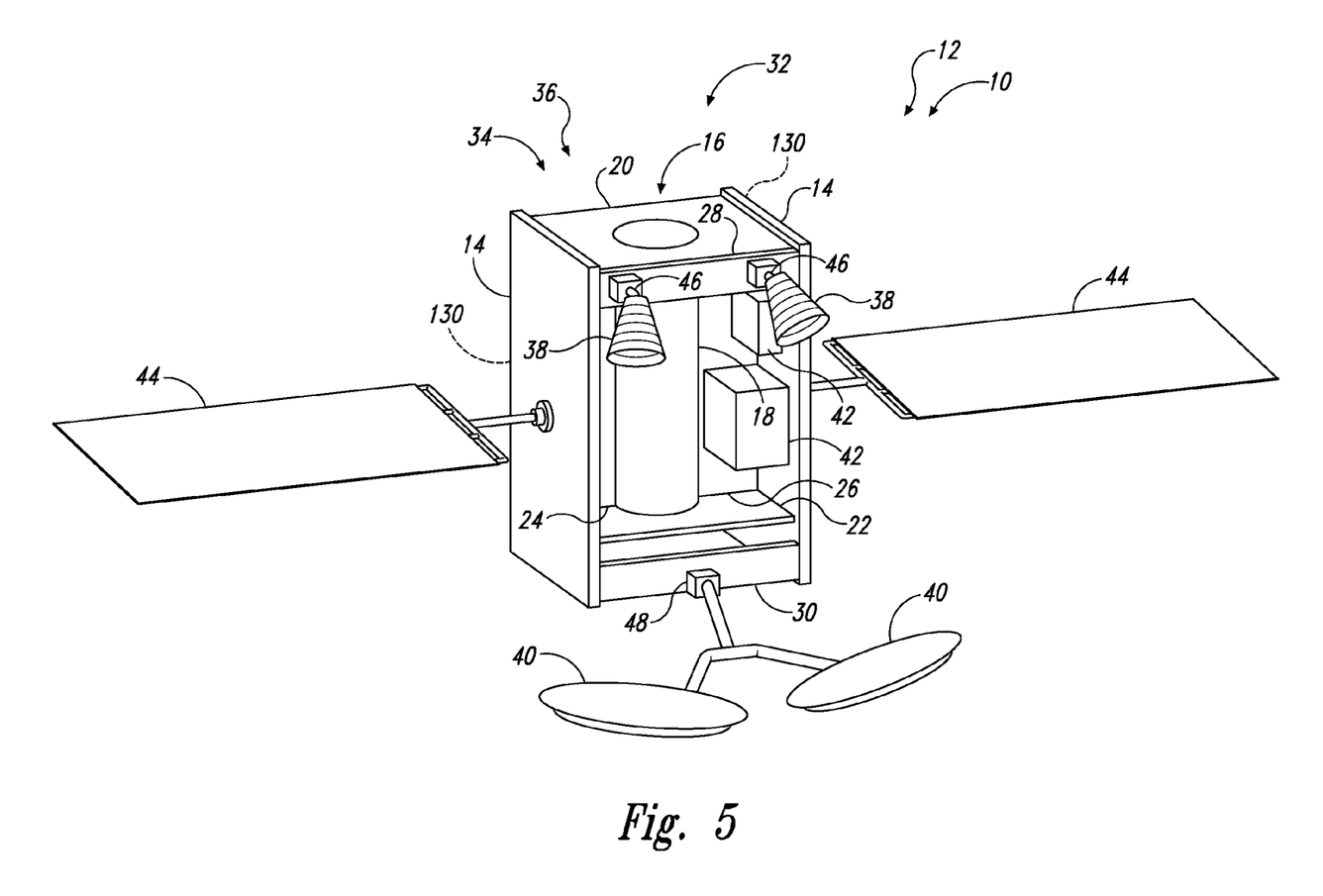
FIG. 5 is an isometric view of an example spacecraft that includes two radiator panels according to the present disclosure.

Turning now to FIG. 5, an example spacecraft 10 according to the present disclosure is illustrated. Spacecraft 10 is in the form of a satellite 12 that includes two radiator panels 14. However, other types of spacecraft 10 are within the scope of the present disclosure, and radiator panels 14 are not limited to being used with satellites, let alone the example satellite 12 illustrated in FIG. 5 and described herein. Moreover, radiator panels 14 may (but are not required to) include and/or be sandwich panels 130 according to the present disclosure.

Spacecraft 10 and satellites 12 include a structural body 16 to which the radiator panels 14 and other equipment are operatively mounted. In the illustrated example of satellite 12, the structural body 16 includes a cylindrical core 18, an upper panel 20, a lower panel 22, a left stiffener 24, a right stiffener 26, an upper antenna bracket 28, and a lower antenna bracket 30. The radiator panels 14 include a left radiator panel 14 that is operatively coupled to the upper panel 20, the left stiffener 24, the lower panel 22, the upper antenna bracket 28, and the lower antenna bracket 30, and a right radiator panel 14 that is operatively coupled to the upper panel 20, the right stiffener 26, the lower panel 22, the upper antenna bracket 28, and the lower antenna bracket 30. Collectively, the radiator panels 14 and the body 16 of the satellite 12 may be described as a spacecraft bus 32, with the bus 32 being used to carry various payloads 34 into outer space. The illustrated and described construction of bus 32 is but one example of a spacecraft 10 and satellite 12, which is provided for illustration purposes only and does not limit the present disclosure to the illustrated example. Additional examples of construction that may be suitable for a spacecraft bus 32 are disclosed in U.S. Patent Application Publication No. 2014/0239124, the disclosure of which is incorporated herein by reference.

The payload 34 of a spacecraft 10 and satellite 12 may take any suitable form and configuration depending on the ultimate application of the spacecraft 10. For example, payload 34 may include various communication devices 36, including (but not limited to) antenna feeds 38 and antenna reflectors 40. At a minimum, payload 34 of a satellite 12 typically includes electronic equipment 42 that is operatively mounted to the inner sides of the radiator panels 14. Accordingly, heat generated by the electronic equipment is conducted to the radiator panels 14, which in turn radiate the heat to outer space. Payload 34 additionally may include structures that are mounted to the outer sides of the radiator panels 14, such as (but not limited to) solar arrays 44, as illustrated in FIG. 5.

Because the radiator panels 14 define structural components of satellite 12, their thermal stability may be critical to ensure that communication devices 36 function as desired. For example, the position of a first communication device, such as in the form of an antenna feed 38, relative to the position of a second communication device, such as in the form of an antenna reflector 40 at which the antenna feed 38 is pointed, may be critical for the effectiveness of the communication devices and thus the satellite 12. A bus 32, including radiator panels 14, therefore may be configured to maintain a desired positional relationship between two communication devices 36 even when the radiator panels 14 are subject to significant thermal changes. This desired positional relationship may be described in terms of the movement of the attachment points of the communication devices to the bus 32. Using the antenna example, an antenna feed 38 may be coupled relative to the body 16 at a first mount 46, and an antenna reflector 40 may be coupled relative to the body 16 at a second mount 48. When one or both of the radiator panels 14 of a satellite 12 is subject to a temperature change between a minimum temperature and a maximum temperature in the range of one or more of −50-100° C., −20-100° C., −20-80° C., 0-100° C., 10-100° C., 20-100° C., 50-100° C., and/or 20-80° C., the first mount may move, rotate, or pivot, relative to the second mount by less than 0.1 degrees, by less than 0.08 degrees, by less than 0.06 degrees, or by less than 0.04 degrees. Any combination of the aforementioned ranges is within the scope of the present disclosure. Additionally or alternatively, when one or both of the radiator panels 14 begin dissipating heat at a rate in the range of one or more of 100-5000 Watts, 100-2500 Watts, 500-5000 Watts, and/or 500-2500 Watts, that is, go from zero Watts to within one of the enumerated ranges, the first mount may move, rotate, or pivot relative to the second mount by less than 0.1 degrees, by less than 0.08 degrees, by less than 0.06 degrees, or by less than 0.04 degrees. Any combination of the aforementioned ranges is within the scope of the present disclosure. As an illustrative, non-exclusive example, when a radiator panel 14 is dissipating heat at a rate in the range of 100-5000 Watts and/or is subject to a temperature change between a minimum temperature and a maximum temperature in the range of −50-100° C., the first mount may move, rotate, or pivot by less than 0.1 degrees.

Figure 6:
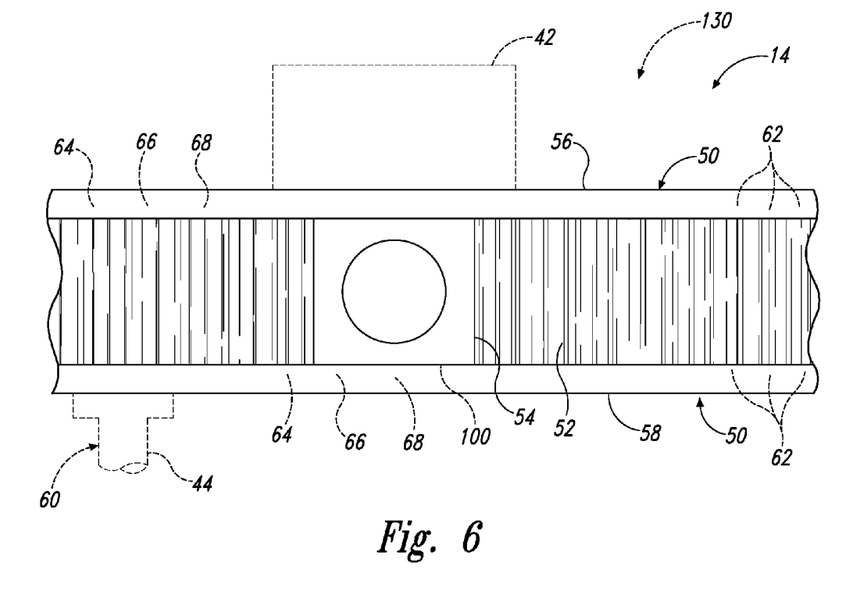
FIG. 6 is a schematic profile view representing radiator panels according to the present disclosure.

Turning now to FIG. 6, examples of radiator panels 14 are schematically represented. Although not required, radiator panels 14 are generally planar and rectangular. Radiator panels 14 include two spaced-apart face-sheets 50, a honeycomb core 52 that is positioned between the face-sheets 50, and one or more heat pipes 54 that extend through the honeycomb core 52 between the face-sheets 50. When a radiator panel 14 is a sandwich panel 130 according to the present disclosure, one or more of heat pipes 54 may be a composite heat pipe 100 according to the present disclosure. The face-sheets 50 include an inside face-sheet 56 that faces the inside of a bus 32 when installed as a component of the bus, and an outside face-sheet 58 that faces the outside of the bus toward outer space. The honeycomb core 52 gives the radiator panel structural support. The one or more heat pipes 54 draw heat from electronic equipment 42 mounted to the inside face-sheet 56 and transfer the heat to the outside face-sheet 58 to be radiated to outer space. As optionally and schematically illustrated in FIG. 6, one or more structures 60 also may be mounted to the outside face-sheet 58, with a solar array 44 being an example.

The honeycomb core 52 of a radiator panel 14 may be constructed of any suitable material, including metal, plastic, and reinforced composite material. A typical example of a metal includes aluminum.

Face-sheets 50 of a radiator panel are constructed at least in part, and in some examples completely, of a fiber reinforced composite material. In some examples, the face-sheets 50 may be constructed as a laminate of multiple plies 62 of material. For example, a face-sheet 50 may include 2-10, 2-8, 2-6, 2-4, 4-10, 4-8, 4-6, 6-10, 6-8, or 8-10 plies 62 of material; however, other numbers of plies 62 may be included in a face-sheet 50, including numbers fewer than, greater than, and within the enumerated ranges. Additionally or alternatively, a face-sheet 50 may include at least one metallic foil layer, such as an aluminum foil layer. In some examples, a face-sheet 50 may have a thickness in the range of 200-1000 μm, 200-800 μm, 200-600 μm, 200-400 μm, 400-1000 μm, 400-800 μm, 400-600 μm, 600-1000 μm, 600-800 μm, or 800-1000 μm; however, other thicknesses of face-sheets 50 also are within the scope of the present disclosure. Any combination of the aforementioned ranges is within the scope of the present disclosure. For example, a face-sheet 50 may include 2-10 plies 62 resulting in a thickness of the face-sheet 50 in the range of 200-1000 μm.

Figure 7:
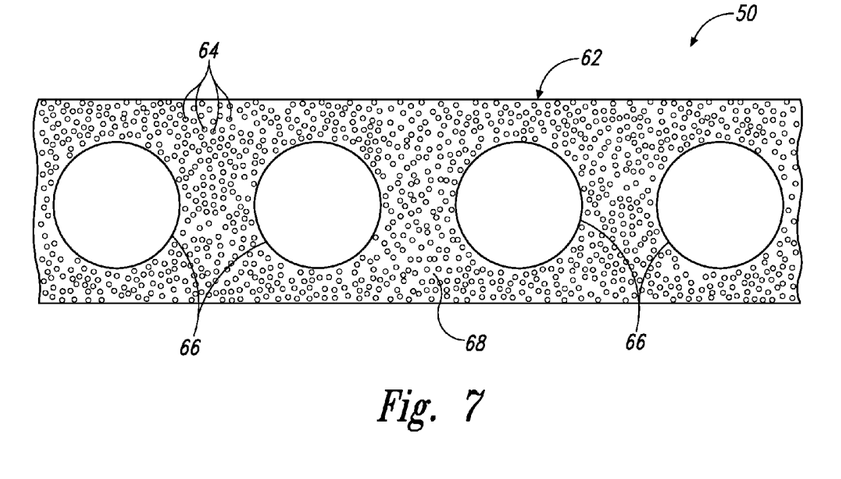
FIG. 7 is a schematic profile view representing a single ply of a face-sheet of a radiator panel according to the present disclosure.

FIG. 7 schematically represents example plies 62 of fiber reinforced composite materials that may be used to construct a face-sheet 50.

In some examples of face-sheets 50, the fiber reinforced composite material may include a set of fibers 64 and a set of fibers 66 within a matrix of binding material 68, and with fibers 64 differing in one or more properties or characteristics from fibers 66.

For example, in some examples of face-sheets 50, the average diameter of fibers 64 may differ from an average diameter of fibers 66. As examples, the average diameter of fibers 66 may be at least 2, at least 4, at least 6, at least 8, 2-10, 2-8, 2-6, 2-4, 4-10, 4-8, 4-6, 6-10, 6-8, or 8-10 times the average diameter of fibers 64. Additionally or alternatively, the average diameter of fibers 64 may be in the range of 5-20 μm, 5-15 μm, 5-10 μm, 10-20 μm, 10-15 μm, or 15-20 μm, and the average diameter of fibers 66 may be in the range of 50-200 μm, 50-150 μm, 50-100 μm, 100-200 μm, 100-150 μm, or 150-200 μm. Other average diameters, as well as ratios of average diameters, are within the scope of the present disclosure. Any combination of the aforementioned ranges is within the scope of the present disclosure. For example, the average diameter of fibers 66 may be at least 2 times the average diameter of fibers 64.

In some examples of face-sheets 50, fibers 64 may be carbon fibers. In some examples of face-sheets 50, fibers 66 may be boron fibers.

In some examples of face-sheets 50, a ratio of a total number of fibers 64 to a total number of fibers 66 within a face-sheet 50 and/or a ply 62 may be in the range of 100-500, 100-400, 100-300, 100-200, 200-500, 200-400, 200-300, 300-500, 300-400, or 400-500; however, other ratios, including ratios within the enumerated ranges, as well as below and above the enumerated ranges, may be utilized in a face-sheet 50 and/or a ply 62 thereof.

In some examples of face-sheets 50, within a single ply 62, fibers 64 may be spaced apart on average in the range of 0-30 μm, 0-20 μm, 0-10 μm, 10-30 μm, 10-20 μm, or 20-30 μm. In some examples of face-sheets 50, within a single ply 62, fibers 66 may be spaced apart on average in the range of 50-200 μm, 50-150 μm, 50-100 μm, 100-200 μm, 100-150 μm, or 150-200 μm. Any ratio of any one of the aforementioned ranges for fibers 64 to any one of the aforementioned ranges for fibers 66 is within the scope of the present disclosure. For example, within a single ply 62, fibers 64 may be spaced apart on average in the range of 0-30 μm, and fibers 66 may be spaced apart on average in the range of 50-200 μm. Moreover, other spacings, including within the enumerated ranges, as well as below and above the enumerated ranges, may be utilized in a ply 62 of a face-sheet 50.

In some examples of face-sheets 50, fibers 64 may have a coefficient of thermal expansion in the range of −0.8-0 ppm/° F. In some examples of face-sheets 50, fibers 66 may have a coefficient of thermal expansion in the range of 2-3 ppm/° F. Any combination of the aforementioned range for fibers 64 and the aforementioned range for fibers 66 may be used.

In some examples of face-sheets 50, fibers 64 may have a thermal conductivity in the range of 75-1100 W/m-K. In some examples of face-sheets 50, fibers 66 may have a thermal conductivity in the range of 25-400 W/m-K. Any combination of the aforementioned range for fibers 64 and the aforementioned range for fibers 66 may be used.

In some examples of face-sheets 50, fibers 64 may have a tensile strength in the range of 400-800 ksi. In some examples of face-sheets 50, fibers 66 may have a tensile strength in the range of 500-600 ksi. Any combination of the aforementioned range for fibers 64 and the aforementioned range for fibers 66 may be used.

In some examples of face-sheets 50, the binding material 68 of the fiber reinforced composite material of a face-sheet 50 or a ply 62 thereof may include epoxy, cyanate ester, polyimide, bismaleimide resin, or phenolic resin. Additionally or alternatively, the binding material 68 also may include a thermal conductivity enhancer, such as one or more of milled carbon fiber, carbon nanotubes, and graphite nanoplatelets.

As discussed above, the face-sheets 50, the honeycomb core 52, and the heat pipes 54 of a radiator panel 14 may have various properties and characteristics depending on a particular example of radiator panel 14. As a result, the properties and characteristics of a radiator panel 14, as a whole, also may vary.

In some examples of radiator panels 14, the radiator panel, as a whole, may have a coefficient of thermal expansion in the range of 0.5-13 ppm/° F. across its thickness. Additionally or alternatively, the radiator panel, as a whole, may have a coefficient of thermal expansion in the range of 0.25-4 ppm/° F. in a direction parallel to the face-sheets 50.

Figure 8:
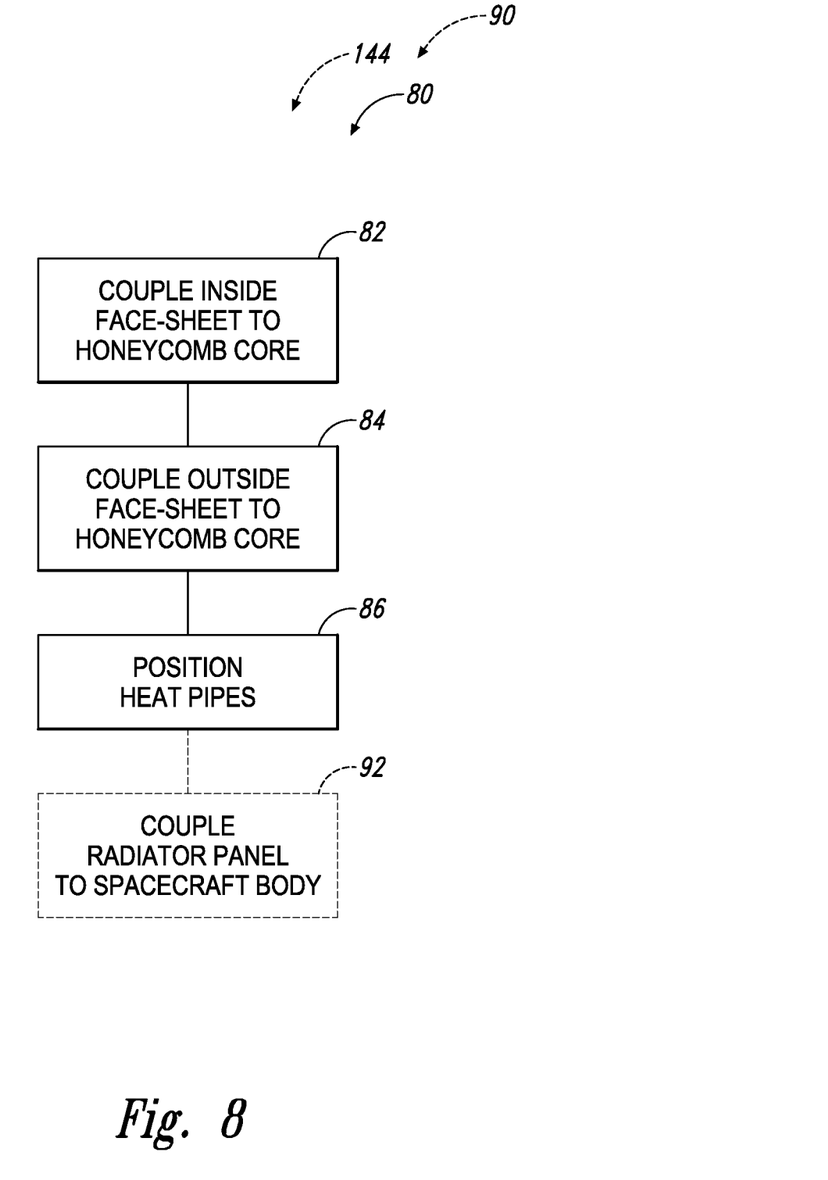
FIG. 8 is a flowchart schematically representing methods according to the present disclosure.

FIG. 8 schematically provides a flowchart that represents illustrative, non-exclusive examples of methods according to the present disclosure. In FIG. 8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 8 are not limiting and other methods and steps are within the scope of the present disclosure, including methods having greater than or fewer than the number of steps illustrated, as understood from the discussions herein.

As schematically illustrated in solid boxes in FIG. 8, methods 80 of assembling a radiator panel 14 for a spacecraft 10 include operatively coupling an inside face-sheet 56 to a honeycomb core 52, as indicated at 82, operatively coupling an outside face-sheet 58 to the honeycomb core 52 opposite the inside face-sheet 56, as indicated at 84, and operatively positioning one or more heat pipes 54 between the inside face-sheet 56 and the outside face-sheet 58, as indicated at 86. As indicated in FIG. 8, a method 80 also may be a method 114 according to the present disclosure.

Methods 90 of assembling a spacecraft 10 also are within the scope of the present disclosure, and as indicated in FIG. 8 at 92 may include at least operatively coupling a radiator panel 14 to a body 16 of the spacecraft 10. Some methods 90 also may include performing a method 80 of assembling the radiator panel 14 prior to the coupling 92.

Illustrative, non-exclusive examples of inventive subject matter according to the present disclosure are described in the following enumerated paragraphs:

A. A composite heat pipe, comprising:

an elongate conductive casing that defines an internal volume having an outer peripheral region;

a wick structure positioned within the outer peripheral region of the internal volume of the elongate conductive casing;

a working fluid within the internal volume of the outer peripheral region; and one or more fiber reinforced composite layers operatively coupled to one or more external, lateral sides of the elongate conductive casing, wherein each fiber reinforced composite layer comprises a plurality of elongate fibers longitudinally aligned with the elongate conductive casing and operatively coupled together by a binding material.

A1. The composite heat pipe of paragraph A1, wherein each fiber reinforced composite layer comprises a film.

A2. The composite heat pipe of any of paragraphs A-A1, wherein the binding material comprises an adhesive tape.

A2.1. The composite heat pipe of paragraph A2, wherein the plurality of elongate fibers is adhered to a face of the adhesive tape.

A2.2. The composite heat pipe of paragraph A2, wherein the plurality of elongate fibers is embedded in the adhesive tape.

A3. The composite heat pipe of any of paragraphs A-A2.2, wherein the binding material comprises a matrix of the binding material and the plurality of elongate fibers are within the matrix.

A4. The composite heat pipe of any of paragraphs A-A3, wherein the binding material comprises, optionally consists essentially of, optionally consists of, epoxy, cyanate ester, polyimide, bismaleimide resin, or phenolic resin.

A5. The composite heat pipe of any of paragraphs A-A4, wherein the plurality of elongate fibers comprises a density of 0.05-0.10 lbs/in.$^3$ within each fiber reinforced composite layer.

A6. The composite heat pipe of any of paragraphs A-A5, wherein the plurality of elongate fibers are spaced-apart within each fiber reinforced composite layer.

A7. The composite heat pipe of any of paragraphs A-A6, wherein the plurality of elongate fibers comprises, optionally consists essentially of, optionally consists of, boron fibers.

A8. The composite heat pipe of any of paragraphs A-A7, wherein the plurality of elongate fibers comprises, optionally consists essentially of, optionally consists of, high strength carbon fibers.

A9. The composite heat pipe of any of paragraphs A-A8, wherein the elongate conductive casing is constructed of a material having a first tensile strength and a first compression strength, and wherein the plurality of elongate fibers are constructed of a material having a second tensile strength that is greater than the first tensile strength and a second compression strength that is greater than the first compression strength.

A9.1. The composite heat pipe of paragraph A9, wherein second tensile strength is at least 1.5, at least 2, at least 5, or at least 10 times the first tensile strength.

A9.2. The composite heat pipe of any of paragraphs A9-A9.1, wherein the second compression strength is at least 1.5, at least 2, at least 5, or at least 10 times the first compression strength.

A10. The composite heat pipe of any of paragraphs A-A9.2, wherein the elongate conductive casing is constructed of aluminum, copper, or steel.

A11. The composite heat pipe of any of paragraphs A-A10, wherein elongate fibers of the plurality of elongate fibers are unidirectional.

A12. The composite heat pipe of any of paragraphs A-A11, wherein the one or more fiber reinforced composite layers comprises two fiber reinforced composite layers operatively coupled to opposing external, lateral sides of the elongate conductive casing.

A13. The composite heat pipe of any of paragraphs A-A12, further comprising:
an adhesive layer between the one or more fiber reinforced composite layers and the respective one or more external, lateral sides of the elongate conductive casing.

A13.1. The composite heat pipe of paragraph A13, wherein the adhesive layer has a thickness of 0.005-0.025 inches.

A13.2. The composite heat pipe of any of paragraphs A13-A13.1, wherein the adhesive layer comprises, optionally consists essentially of, optionally consists of, an epoxy adhesive.

A14. The use of the composite heat pipe of any of paragraphs A-A13.2 as a structural component of a sandwich panel, a radiator panel, a radiator panel for a spacecraft, a radiator panel for a phased array, or a base plate for an antenna.

B. A method of assembling a composite heat pipe, the method comprising:
operatively coupling one or more fiber reinforced composite layers to one or more external, lateral sides of an elongate conductive casing;
wherein the one or more fiber reinforced composite layers and/or the elongate conductive casing includes the subject matter of any of paragraphs A-A13.3.

B1. The method of paragraph B, wherein the operatively coupling is performed in an environment at 50-100° F., optionally at room temperature.

C. A sandwich panel, comprising:
two spaced-apart face-sheets;
a core positioned between the two spaced-apart face-sheets; and
one or more composite heat pipes according to any of paragraphs A-A13.3 extending through the core without the one or more fiber reinforced composite layers extending directly between the one or more composite heat pipes and the two spaced-apart face-sheets.

C1. The sandwich panel of paragraph C, wherein the core comprises, optionally consists essentially of, optionally consists of, a honeycomb core.

C2. The sandwich panel of any of paragraphs C-C1, wherein the core is constructed of metal, optionally of aluminum.

C3. The sandwich panel of any of paragraphs C-C2, wherein the two spaced-apart face-sheets are constructed of a fiber reinforced composite material.

C4. The sandwich panel of any of paragraphs C-C3, further comprising:
a foam adhesive that operatively couples the one or more composite heat pipes to the core.

C5. The sandwich panel of any of paragraphs C-C4, wherein the one or more fiber reinforced composite layers of the one or more composite heat pipes is constructed of a composite laminate that is cured at room temperature prior to the one or more composite heat pipes being bonded to the two spaced-apart face sheets at an elevated temperature.

C6. The sandwich panel of any of paragraphs C-C5, wherein the sandwich panel comprises one of a radiator panel, a radiator panel for a spacecraft, a radiator panel for a phased array, and a base plate for an antenna.

C7. The use of the sandwich panel of any of paragraphs C-C6 as a radiator panel, a radiator panel for a spacecraft, a radiator panel for a phased array, or a base plate for an antenna.

D. A method of assembling a sandwich panel, the method comprising:
operatively coupling a first face-sheet to a core;
operatively coupling a second face-sheet to the core opposite the first face-sheet; and
operatively positioning one or more composite heat pipes between the first face-sheet and the second face-sheet;
wherein the first face-sheet, the second face-sheet, the core, and/or the one or more composite heat pipes includes the subject matter of any of paragraphs C-C6.

D1. The method of paragraph D, further comprising:
prior to the operatively positioning, assembling the one or more composite heat pipes according to the method of any of paragraphs B-B1.

D2. The method of any of paragraphs D-D1, further comprising:
following the operatively coupling the first face-sheet, the operatively coupling the second face-sheet, and the operatively positioning, curing the sandwich panel at an elevated temperature, optionally at a temperature of 150-250° F.

E. A radiator panel, the radiator panel comprising:
two spaced-apart face-sheets including an inside face-sheet and an outside face-sheet, wherein the two spaced-apart face-sheets are constructed of a fiber reinforced composite material;
a honeycomb core positioned between the two spaced-apart face-sheets; and
one or more heat pipes extending through the honeycomb core.

E1. The radiator panel of paragraph E, wherein the honeycomb core is constructed of metal, optionally of aluminum.

E2. The radiator panel of any of paragraphs E-E1, wherein the one or more heat pipes are constructed of metal, optionally of aluminum.

E3. The radiator panel of any of paragraphs E-E2, wherein the fiber reinforced composite material includes a first set of fibers and a second set of fibers, wherein the fibers of the first set differ from the fibers of the second set in at least one characteristic.

E3.1. The radiator panel of paragraph E3, wherein the first set of fibers includes fibers having a first average diameter, and wherein the second set of fibers includes fibers having a second average diameter that is different than the first average diameter.

E3.1.1. The radiator panel of paragraph E3.1, wherein the second average diameter is at least 2, at least 4, at least 6, at least 8, 2-10, 2-8, 2-6, 2-4, 4-10, 4-8, 4-6, 6-10, 6-8, or 8-10 times the first average diameter.

E3.1.2. The radiator panel of any of paragraphs E3.1-E3.1.1, wherein the first average diameter is in the range of 5-20 µm, 5-15 µm, 5-10 µm, 10-20 µm, 10-15 µm, or 15-20 µm.

E3.1.3. The radiator panel of any of paragraphs E3.1-E3.1.2, wherein the second average diameter is in the range of 50-200 µm, 50-150 µm, 50-100 µm, 100-200 µm, 100-150 µm, or 150-200 µm.

E3.2. The radiator panel of any of paragraphs E3-E3.1.3, wherein the fibers of the first set comprise, optionally consist essentially of, optionally consist of, carbon fibers, and wherein the fibers of the second set do not comprise carbon fibers.

E3.3. The radiator panel of any of paragraphs E3-E3.2, wherein the fibers of the second set comprise, optionally consist essentially of, optionally consist of, boron fibers, and wherein the fibers of the first set do not comprise boron fibers.

E3.4. The radiator panel of any of paragraphs E3-E3.3, wherein a ratio of a total number of the first set of fibers to a total number of the second set of fibers is in the range of 100-500, 100-400, 100-300, 100-200, 200-500, 200-400, 200-300, 300-500, 300-400, or 400-500.

E3.5. The radiator panel of any of paragraphs E3-E3.4, wherein within a single ply of the fiber reinforced composite material, fibers of the first set of fibers are spaced apart on average in the range of 0-30 μm, 0-20 μm, 0-10 μm, 10-30 μm, 10-20 μm, or 20-30 μm.

E3.6. The radiator panel of any of paragraphs E3-E3.5, wherein within a/the single ply of the fiber reinforced composite material, fibers of the second set of fibers are spaced apart on average in the range of 50-200 μm, 50-150 μm, 50-100 μm, 100-200 μm, 100-150 μm, or 150-200 μm.

E3.7. The radiator panel of any of paragraphs E3-E3.6, wherein the first set of fibers includes fibers having a coefficient of thermal expansion in the range of −0.8-0 ppm/° F.

E3.8. The radiator panel of any of paragraphs E3-E3.7, wherein the second set of fibers includes fibers having a coefficient of thermal expansion in the range of 2-3 ppm/° F.

E3.9. The radiator panel of any of paragraphs E3-E3.8, wherein the first set of fibers includes fibers having a thermal conductivity in the range of 75-1100 W/m-K.

E3.10. The radiator panel of any of paragraphs E3-E3.9, wherein the second set of fibers includes fibers having a thermal conductivity in the range of 25-400 W/m-K.

E3.11. The radiator panel of any of paragraphs E3-E3.10, wherein the first set of fibers includes fibers having a tensile strength in the range of 400-800 ksi.

E3.12. The radiator panel of any of paragraphs E3-E3.11, wherein the second set of fibers includes fibers having a tensile strength in the range of 500-600 ksi.

E4. The radiator panel of any of paragraphs E-E3.12, wherein the inside face-sheet includes, optionally consists essentially of, optionally consists of, 2-10, 2-8, 2-6, 2-4, 4-10, 4-8, 4-6, 6-10, 6-8, or 8-10 plies of the fiber reinforced composite material.

E4.1. The radiator panel of paragraph E4, wherein the inside face-sheet further includes at least one metallic foil layer, optionally an aluminum foil layer.

E5. The radiator panel of any of paragraphs E-E4.1, wherein the outside face-sheet includes, optionally consists essentially of, optionally consists of, 2-10, 2-8, 2-6, 2-4, 4-10, 4-8, 4-6, 6-10, 6-8, or 8-10 plies of the fiber reinforced composite material.

E5.1. The radiator panel of paragraph E5, wherein the outside face-sheet further includes at least one metallic foil layer, optionally an aluminum foil layer.

E6. The radiator panel of any of paragraphs E-E5.1, wherein the inside face-sheet has a thickness in the range of 200-1000 μm, 200-800 μm, 200-600 μm, 200-400 μm, 400-1000 μm, 400-800 μm, 400-600 μm, 600-1000 μm, 600-800 μm, or 800-1000 μm.

E7. The radiator panel of any of paragraphs E-E6, wherein the outside face-sheet has a thickness in the range of 200-1000 μm, 200-800 μm, 200-600 μm, 200-400 μm, 400-1000 μm, 400-800 μm, 400-600 μm, 600-1000 μm, 600-800 μm, or 800-1000 μm.

E8. The radiator panel of any of paragraphs E-E7, wherein the fiber reinforced composite material includes a binding material that includes, optionally consists essentially of, optionally consists of, epoxy, cyanate ester, polyimide, bis-maleimide resin, or phenolic resin.

E8.1. The radiator panel of paragraph E8, wherein the binding material further includes a thermal conductivity enhancer, optionally one or more of milled carbon fiber, carbon nanotubes, and graphite nanoplatelets.

E9. The radiator panel of any of paragraphs E-E8.1, wherein the radiator panel, as a whole, has a coefficient of thermal expansion in the range of 0.5-13 ppm/° F. across a thickness of the radiator panel.

E10. The radiator panel of any of paragraphs E-E9, wherein the radiator panel, as a whole, has a coefficient of thermal expansion in the range of 0.25-4 ppm/° F. in a direction parallel to the inside face-sheet and the outside face-sheet.

E11. The radiator panel of any of paragraphs E-E10, wherein the radiator panel is generally planar.

E12. The radiator panel of any of paragraphs E-E11, wherein the radiator panel is generally rectangular.

E13. The radiator panel of any of paragraphs E-E12, wherein the one more heat pipes comprise one or more of the composite heat pipe of any of paragraphs A-A13.3.

E14. The use of the radiator panel of any of paragraphs E-E13 as a structural component of a spacecraft.

E15. The use of the radiator panel of any of paragraphs E-E13 to improve the precision of communication devices of a spacecraft.

E16. The use of the radiator panel of any of paragraphs E-E13 as one or more of a radiator panel for a spacecraft, a radiator panel for a phased array, or a base plate for an antenna.

F. A spacecraft, comprising:
a body; and
two radiator panels of any of paragraphs E-E13 operatively coupled to the body opposite each other.

F1. The spacecraft of paragraph F, further comprising:
a first communication device operatively coupled relative to the body by a first mount; and
a second communication device operatively coupled relative to the body by a second mount.

F1.1. The spacecraft of paragraph F1, wherein the first communication device and the second communication device are electrically grounded to the two radiator panels.

F1.2. The spacecraft of any of paragraphs F1-F1.1, wherein when one or both of the two radiator panels is subject to a temperature change between a minimum temperature and a maximum temperature in the range of −50-100° C., −20-100° C., −20-80° C., 0-100° C., 10-100° C., 20-100° C., 50-100° C., or 20-80° C., the first mount moves, rotates, or pivots relative to the second mount by less than 0.1 degrees, 0.08 degrees, 0.06 degrees, or 0.04 degrees.

F1.3. The spacecraft of any of paragraphs F1-F1.2, wherein when one or both of the radiator panels begins dissipating heat at a rate in the range of 100-5000 Watts, 100-2500 Watts, 500-5000 Watts, or 500-2500 Watts, the first mount moves, rotates, or pivots relative to the second mount by less than 0.1 degrees, 0.08 degrees, 0.06 degrees, or 0.04 degrees.

F2. The spacecraft of any of paragraphs F-F1.3, wherein the first communication device includes an antenna feed, wherein the second communication device includes an antenna reflector, and wherein the antenna feed is pointed at the antenna reflector.

F3. The spacecraft of any of paragraphs F-F2, wherein the spacecraft is free of one or more of star tracker mounts, stand-alone antenna mounts, and sensor suite optical bench mounts.

F4. The use of the spacecraft of any of paragraphs F-F3, optionally as a communications satellite.

G. A method of assembling a radiator panel, the method comprising:

operatively coupling an inside face-sheet to a honeycomb core;

operatively coupling an outside face-sheet to the honeycomb core opposite the inside face-sheet; and operatively positioning one or more heat pipes between the inside face-sheet and the outside face-sheet;

wherein the inside face-sheet, the outside face-sheet, the honeycomb core, and/or the one or more heat pipes include the subject matter of any of paragraphs E-E13.

H. A method of assembling a spacecraft, the method comprising:

operatively coupling a radiator panel to a body of the spacecraft, wherein the radiator panel includes the subject matter of any of paragraphs E-E13, and wherein the spacecraft includes the subject matter of any of paragraphs F-F3.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A composite heat pipe, comprising:
   an elongate conductive casing that defines an internal volume having an outer peripheral region;
   a wick structure positioned within the outer peripheral region of the internal volume of the elongate conductive casing;
   a working fluid within the internal volume of the elongate conductive casing; and
   one or more fiber reinforced composite layers operatively coupled to one or more external, lateral sides of the elongate conductive casing, wherein each fiber reinforced composite layer comprises a plurality of elongate fibers longitudinally aligned with the elongate conductive casing and operatively coupled together by a binding material;
   wherein the composite heat pipe is configured such that the working fluid undergoes a phase transition to transfer heat from one location to another.

2. The composite heat pipe of claim 1, wherein the binding material comprises an adhesive tape.

3. The composite heat pipe of claim 2, wherein the plurality of elongate fibers is adhered to a face of the adhesive tape.

4. The composite heat pipe of claim 2, wherein the plurality of elongate fibers is embedded in the adhesive tape.

5. The composite heat pipe of claim 1, wherein the binding material comprises a matrix of the binding material and the plurality of elongate fibers are within the matrix.

6. The composite heat pipe of claim 1, wherein the plurality of elongate fibers comprises a density of 0.05-0.10 lbs/in.$^3$ within each fiber reinforced composite layer.

7. The composite heat pipe of claim 1, wherein the plurality of elongate fibers are spaced-apart within each fiber reinforced composite layer.

8. The composite heat pipe of claim 1, wherein the plurality of elongate fibers comprises boron fibers or high-strength carbon fibers.

9. The composite heat pipe of claim 1, wherein the elongate conductive casing is constructed of a material having a first tensile strength and a first compression strength, wherein the plurality of elongate fibers are constructed of a material having a second tensile strength and a second compression strength, wherein the second tensile strength is at least 2 times the first tensile strength, and wherein the second compression strength is at least 2 times the first compression strength.

10. The composite heat pipe of claim 1, wherein elongate fibers of the plurality of elongate fibers are unidirectional.

11. The composite heat pipe of claim 1, wherein the one or more fiber reinforced composite layers comprises two fiber reinforced composite layers operatively coupled to opposing external, lateral sides of the elongate conductive casing.

12. The composite heat pipe of claim 1, further comprising:
   an adhesive layer between the one or more fiber reinforced composite layers and the respective one or more external, lateral sides of the elongate conductive casing, wherein the adhesive layer has a thickness of 0.005-0.025 inches, and wherein the adhesive layer comprises an epoxy adhesive.

13. A sandwich panel, comprising:
   two spaced-apart face-sheets;
   a core positioned between the two spaced-apart face-sheets; and
   one or more composite heat pipes according to claim 1 extending through the core without the one or more fiber reinforced composite layers extending directly between any of the one or more composite heat pipes and either of the two spaced-apart face-sheets.

14. The sandwich panel of claim 13, wherein the one or more fiber reinforced composite layers of the one or more composite heat pipes is constructed of a composite laminate that is cured at room temperature prior to the one or more composite heat pipes being bonded to the two spaced-apart face sheets at an elevated temperature.

15. The sandwich panel of claim 13, wherein the two-spaced face-sheets are constructed of a fiber reinforced composite material, and wherein the elongate conductive casing is constructed of aluminum.

16. A method of assembling the sandwich panel of claim 13, the method comprising:
   in an environment at 50-100° F., operatively coupling the one or more fiber reinforced composite layers to the one or more external, lateral sides of the elongate conductive casing;
   operatively coupling a first face-sheet of the two spaced-apart face-sheets to the core;
   operatively coupling a second face-sheet of the two spaced-apart face-sheets to the core opposite the first face-sheet; and
   operatively positioning the one or more composite heat pipes between the first face-sheet and the second face-sheet;
   following the operatively coupling the one or more fiber reinforced composite layers, the operatively coupling the first face-sheet, the operatively coupling the second face-sheet, and the operatively positioning, curing the sandwich panel at a temperature of 150-250° F.

17. A radiator panel, the radiator panel comprising:
   two spaced-apart face-sheets including an inside face-sheet and an outside face-sheet, wherein the two spaced-apart face-sheets are constructed of a fiber reinforced composite material, wherein the fiber reinforced composite material includes a first set of fibers and a second set of fibers, wherein the fibers of the first set differ from the fibers of the second set in at least one characteristic;

a honeycomb core positioned between the two spaced-apart face-sheets; and one or more composite heat pipes according to claim 1 extending through the honeycomb core.

18. The radiator panel of claim 17, wherein the first set of fibers includes fibers having a first average diameter, and wherein the second set of fibers includes fibers having a second average diameter that is different than the first average diameter.

19. The radiator panel of claim 18, wherein the first average diameter is in the range of 5-20 µm, and wherein the second average diameter is in the range of 50-200 µm.

20. The radiator panel of claim 17, wherein the fibers of the first set comprise carbon fibers, and wherein the fibers of the second set comprise boron fibers.

21. A spacecraft, comprising:

a body; and two radiator panels of claim 17 operatively coupled to the body opposite each other.

\* \* \* \* \*